(12) United States Patent
Arakelian et al.

(10) Patent No.: US 9,975,525 B2
(45) Date of Patent: May 22, 2018

(54) JOCKEY WHEEL WITH ADJUSTABLE HEIGHT ASSEMBLY

(71) Applicant: ARK Corporation Pty Ltd, Arndell Park (AU)

(72) Inventors: Richard Arakelian, Arndell Park (AU); Hsuan-chi Kuo, Arndell Park (AU)

(73) Assignee: Ark Corporation Pty Ltd, Arndell Park (AU)

( * ) Notice: Subject to any disclaimer, the term of this patent is extended or adjusted under 35 U.S.C. 154(b) by 395 days.

(21) Appl. No.: 14/307,197

(22) Filed: Jun. 17, 2014

(65) Prior Publication Data

US 2014/0367625 A1    Dec. 18, 2014

(30) Foreign Application Priority Data

Jun. 17, 2013    (AU) .................................. 2013902170

(51) Int. Cl.
*B60D 1/46*    (2006.01)
*B60D 1/66*    (2006.01)
*B60S 9/18*    (2006.01)

(52) U.S. Cl.
CPC ............... *B60S 9/18* (2013.01); *B60D 1/665* (2013.01)

(58) Field of Classification Search
CPC .......... B60D 1/465; B60D 1/665; B60D 9/18; Y10T 74/20744; A61G 1/0243
See application file for complete search history.

(56) References Cited

U.S. PATENT DOCUMENTS

| | | | | |
|---|---|---|---|---|
| 1,373,352 A | * | 3/1921 | Rice | B60D 1/246 280/3 |
| 1,958,494 A | * | 5/1934 | Pehrsson | B62B 1/00 16/21 |
| 3,156,315 A | * | 11/1964 | Hawgood | B60D 1/246 172/41 |
| 3,595,527 A | * | 7/1971 | Douglass | B60D 1/66 254/420 |
| 3,841,663 A | * | 10/1974 | Proffit | B60D 1/66 248/188.4 |
| 3,861,482 A | * | 1/1975 | Stephens | B60D 1/246 180/13 |
| 4,176,824 A | * | 12/1979 | Linton | B60S 9/10 254/423 |
| 4,205,413 A | * | 6/1980 | Collignon | B60B 33/021 16/35 D |
| 4,227,706 A | * | 10/1980 | Morris | B60D 1/246 192/50 |

(Continued)

FOREIGN PATENT DOCUMENTS

DE    1506007 A1 *    10/1970    ............... B60D 1/28
DE    29704612 U1 *    4/1997    ............. B60D 1/465
(Continued)

*Primary Examiner* — Joseph J Hail
*Assistant Examiner* — Arman Milanian
(74) *Attorney, Agent, or Firm* — Braxton Perrone, PLLC

(57) ABSTRACT

A jockey wheel includes at least one ground engaging wheel; a mount for mounting the jockey wheel to a frame of a trailed vehicle; a jockey wheel post carrier for carrying a jockey wheel post; a coarse height adjuster for coarsely adjusting the height of the jockey wheel post, wherein the coarse height adjuster includes a locking selector for selecting a jockey wheel post height, the locking selector being biased into a locking position.

16 Claims, 19 Drawing Sheets

(56) References Cited

U.S. PATENT DOCUMENTS

| | | | | |
|---|---|---|---|---|
| 4,238,113 A * | 12/1980 | Adams | ................... | B60S 9/08 254/134 |
| 4,623,125 A * | 11/1986 | Ebey | ................... | B60D 1/66 254/418 |
| 5,016,900 A * | 5/1991 | McCully | ................... | B60D 1/66 180/19.2 |
| 5,040,937 A * | 8/1991 | Godbersen | ............ | B60P 3/1033 280/414.1 |
| 5,067,692 A * | 11/1991 | Nudd | ................... | B60D 1/66 254/420 |
| 5,282,605 A * | 2/1994 | Sauber | ................... | B60D 1/66 254/420 |
| 6,302,381 B1 * | 10/2001 | Roll | ................... | B60D 1/66 254/418 |
| 6,439,545 B1 * | 8/2002 | Hansen | ................... | B60D 1/246 254/418 |
| D476,461 S * | 6/2003 | Dries | ................... | D34/31 |
| 6,619,671 B1 * | 9/2003 | Fine | ................... | B60D 1/66 280/3 |
| 6,945,343 B1 * | 9/2005 | Moreau | ................... | B60D 1/246 180/11 |
| 7,246,413 B2 * | 7/2007 | Portelli | ................... | A47B 95/02 16/414 |
| 7,328,761 B1 * | 2/2008 | Tyler | ................... | B60S 9/215 180/11 |
| 7,494,154 B2 * | 2/2009 | Richards | ................... | B60D 1/66 180/11 |
| 7,547,044 B2 * | 6/2009 | Cokeley | ................... | B60P 3/36 280/475 |
| 9,308,894 B2 * | 4/2016 | Lusty | ................... | B60S 9/08 |
| 2003/0038454 A1 * | 2/2003 | Valencia | ................... | B60D 1/075 280/511 |
| 2003/0137159 A1 * | 7/2003 | Rolph | ................... | B60D 1/00 296/26.08 |
| 2004/0262882 A1 * | 12/2004 | Huddleston | ............ | B60D 1/66 280/476.1 |
| 2007/0181864 A1 * | 8/2007 | Bartee | ................... | B60S 9/18 254/424 |
| 2009/0236578 A1 * | 9/2009 | Nirenberg | ............ | B60D 1/248 254/420 |
| 2010/0117038 A1 * | 5/2010 | Pinnell, III | ............ | B60S 9/20 254/420 |
| 2012/0261903 A1 * | 10/2012 | Arakelian | ................ | B60S 9/18 280/476.1 |

FOREIGN PATENT DOCUMENTS

| | | | | |
|---|---|---|---|---|
| DE | 29803391 U1 * | 5/1998 | ............ | B60D 1/66 |
| FR | 1346661 A * | 12/1963 | ............ | B60D 1/66 |
| FR | 1412915 A * | 10/1965 | ............ | B60D 1/66 |
| FR | 2600946 A1 * | 1/1988 | ............ | B60D 1/66 |
| WO | WO 2009020449 A1 * | 2/2009 | ............ | B60D 1/246 |

* cited by examiner

JOCKEY WHEEL WITH ADJUSTABLE HEIGHT ASSEMBLY

FIELD OF THE INVENTION

The present invention relates generally to jockey wheels, also known as trailer jacks. DEFINITIONS: Throughout this specification and the claims that follow, the phrase "jockey wheels" and variants thereof should be understood as being completely interchangeable with the phrase "trailer jacks" and variants thereof.

Particular embodiments of the present invention find successful application in off road situations where there are increased ride heights, increased drawbar loads for heavier trailer applications, as well as more challenging terrains such as softer ground, rough ground compared with road surfaces, and bumps and holes.

BACKGROUND OF THE INVENTION

Jockey wheels provide a swivelling wheel arrangement disposed at a front end region of a trailer to assist in pushing or moving the trailer small distances in various directions when the trailer is not attached to a towing vehicle such as a car or prime mover. In known designs a ground engaging wheel is swivel mounted to a base of a wheel post with a trailing arm to facilitate swiveling about a yaw axis. Jockey wheels also may assist with coupling a trailer coupling to a trailer hitch by facilitating alignment of a trailer end of a coupling with a cooperating vehicle end of a coupling by raising and lowering the front end of the trailer.

Once the trailer is coupled to a towing vehicle, the towing vehicle can support and haul the trailer itself, and at that time the jockey wheel is stowed.

To deploy one known jockey wheel design, a cylindrical support post of a jockey wheel is mounted in a saddle bracket against a trailer frame element. To stow that known jockey wheel, the bolts fastening the saddle bracket are opened, the cylindrical support post and jockey wheel are removed from the saddle bracket and the jockey wheel is then stowed in a nearby, conveniently-sized box or trunk.

Other known jockey wheel designs include pivoting jockey wheel mounting brackets so that the jockey wheel remains substantially permanently mounted or bolted to the trailer frame element but can pivot so that the jockey wheel can be pivoted between stowed and deployed positions.

Known jockey wheel designs are generally flimsy and poorly suited to heavy duty and/or off road applications.

The present invention seeks to provide a new jockey wheel.

SUMMARY OF THE INVENTION

In accordance with a first aspect of the present invention there is provided a jockey wheel including:
at least one ground engaging wheel;
a mount for mounting the jockey wheel to a frame element of a trailed vehicle;
a jockey wheel post assembly carrier for carrying a jockey wheel post;
a coarse height adjuster for adjusting the height of the jockey wheel post,
the coarse height adjuster including a locking selector for selecting a jockey wheel post height, the locking selector being biased into a locking position.

In accordance with a second aspect of the present invention there is provided a jockey wheel including:
at least one ground engaging wheel;
a mount for mounting the jockey wheel to a frame element of a trailed vehicle;
a jockey wheel post carrier for carrying a jockey wheel post; and
a wheel yaw lock for inhibiting wheel movement about a yaw axis.

In accordance with a third aspect of the present invention there is provided a jockey wheel including:
at least one ground engaging wheel;
a mount for mounting the jockey wheel to a frame element of a trailed vehicle;
a jockey wheel post carrier for carrying a jockey wheel post,
wherein the jockey wheel post is orthogonal in section.

In one embodiment the mount is a trailer frame mount and includes a clamp for clamping the jockey wheel post carrier to the trailer frame. In one embodiment the clamp includes at least one backing member and a jockey wheel post carrier mounting member. In one embodiment the clamp includes at least one bolt for clamping the backing member to the jockey wheel post carrier member.

In one embodiment the jockey wheel post carrier mounting member includes a bearing so that the jockey wheel post carrier may swivel or pivot about a pitch axis between a deployed position in which the jockey wheel post is substantially vertical and a stowed position in which the jockey wheel post is substantially horizontal.

In one embodiment the jockey wheel post carrier includes a main carrier body and a post. The post includes a post carrying sleeve and an extensible post portion which is configured to extend from the post carrying sleeve. The main carrier body includes a void through the main carrier body for receiving and carrying the post carrying sleeve. In one embodiment the main carrier body includes the coarse height adjuster locking selector mounted thereon. In one embodiment the locking selector includes at least one pin for interengagement with a cooperating aperture disposed on a coarse adjustment plate. In one embodiment the coarse adjustment plate is disposed on the post carrying sleeve and fastened thereto.

In one embodiment the coarse adjustment plate is disposed flat against the post carrying sleeve which is closed along its walls and adjacent the cooperating apertures on the coarse adjustment plate so that the wall of the post carrying sleeve closes the apertures at the end of the coarse adjustment plate.

In one embodiment the locking selector includes a pin carrier for carrying locking pins. In one embodiment the pin carrier is operatively connected to actuation handles for withdrawing the pins from a locking position into a free position in which the pins are disengaged from the cooperating apertures on the coarse adjustment plate.

In one embodiment the locking selector includes an actuation handle connecting two pins for interengaging with the cooperating apertures.

In one embodiment the pins are biased into the locking position in which they are interengaged with the cooperating apertures on the coarse adjustment plate. In one embodiment it is the pin carrier which is biased into the locking position. In one embodiment the pin carrier plate is biased in the locking position by at least one spring. In one embodiment the jockey wheel post carrier includes a spring base bracket for supporting the spring.

In one embodiment the jockey wheel post sleeve includes a square hollow section post to facilitate simple and strong interfaces with associated parts. In one embodiment the jockey wheel post includes an extensible post portion disposed within the square hollow section post to reduce storage volume required in the stowed position and to facilitate protection of the extensible post portion. In one embodiment the extensible post portion is operatively connected to the square hollow section post by a fine tune extender assembly. In one embodiment the fine tune extender assembly is a threaded post cooperating with a threaded collar.

In one embodiment the fine tune extender assembly is operatively connected to an actuation handle. In one embodiment the actuation handle is detachable. In one embodiment the actuation handle includes a socket for cooperating with a male head. In one embodiment the socket includes a magnet at an inner end of the socket for temporary grip on the male head.

In one embodiment the at least one ground engaging wheel is disposed on the jockey wheel post. In one embodiment the at least one ground engaging wheel is disposed on the extensible post, and in one embodiment at the base thereof. In one embodiment the at least one ground engaging wheel is disposed in a wheel carrier. In one embodiment the wheel carrier includes two spaced-apart arms to operatively carry two wheels disposed at their ends to spread the normal force load from the jockey wheel over a larger tyre contact area. This is particularly advantageous for off road applications to as to provide improved ground flotation over soft ground. The wheel carrier forms a wheel bight, such that the spaced-apart arms are disposed outside the two wheels to facilitate their protection. The spaced apart arms are not only spaced apart, and further apart than is typical for a road jockey wheel, to provide a double tyre clearance, or a wider tyre clearance for improved float, but the arms are longer than is typical to provide a long trail, and improved and faster aligning of the tyres when the direction of travel is changed or desired to be changed.

The wheel carrier in one embodiment is a strap which extends from one side of the wheel assembly to the other, having an intermediate portion which is connected to the extensible post portion.

In one embodiment the yaw lock includes a yaw lock receiving flange disposed at the base of the extensible post. In one embodiment the flange is adapted to interlock with a cooperating yaw catch disposed on the jockey wheel post. In one embodiment the cooperating yaw catch includes a yaw locking pin. In one embodiment the yaw locking pin can move from an unlocked position to a locked position. In one embodiment the yaw lock includes a biasing means adapted to bias the yaw locking pin into the unlocked position. In one embodiment the cooperating yaw catch includes a yaw locking pin mounting flange disposed on the base of the jockey wheel post. In one embodiment the yaw locking pin in the yaw locking position is such that it extends from the yaw locking pin mounting flange into the flange. In one embodiment the yaw lock receiving flange includes a plurality of apertures spaced around the flange for receiving the yaw lock pin. In one embodiment the apertures are through apertures. In one embodiment the through apertures are elongate and tapered at each end of the elongate aperture so as to facilitate retention and inhibit clatter.

In one embodiment the yaw locking pin has a lug so as to hold the yaw locking pin into the locked position.

Advantageously, preferred embodiments of the present invention provide a jockey wheel which facilitates coarse height adjustments.

Advantageously, preferred embodiments of the present invention provide a jockey wheel which facilitates fine height adjustments.

Advantageously, preferred embodiments of the present invention provide a jockey wheel which facilitates manufacture.

Advantageously, preferred embodiments of the present invention provide a jockey wheel which selectively inhibits yaw movement of a wheel assembly. This can assist with direction when manually pushing the trailer but principally reduces wheel clatter during towing when stowed.

BRIEF DESCRIPTION OF THE DRAWINGS

In order to enable a clearer understanding, example embodiments of the invention will now be further explained and illustrated by reference to the accompanying drawings, in which.

DETAILED DESCRIPTION OF EXAMPLE EMBODIMENTS

Figure 1:
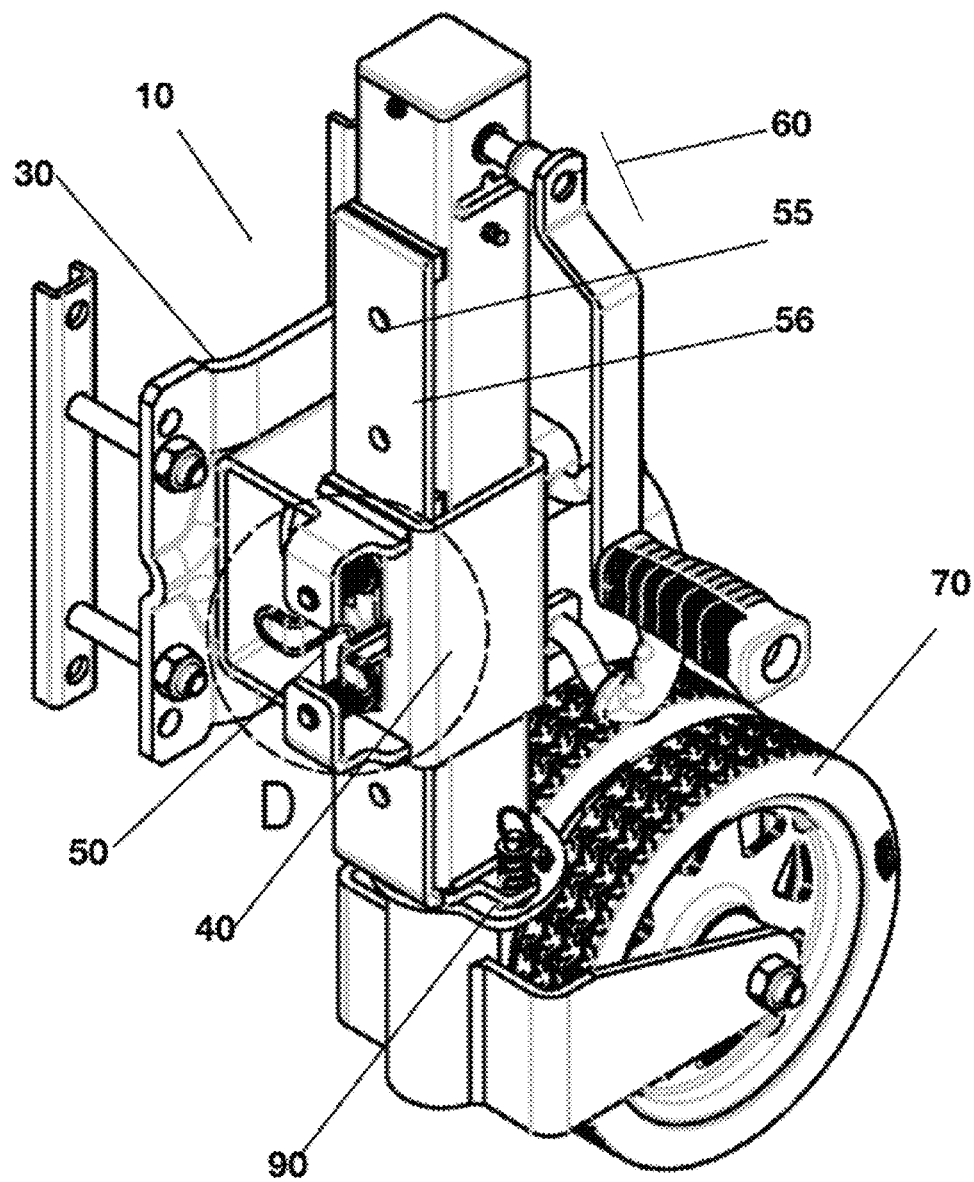
FIG. 1 is an isometric view of a jockey wheel in accordance with one embodiment of the present invention, the view from a position in front, above and to one side of the jockey wheel.
Figure 2:
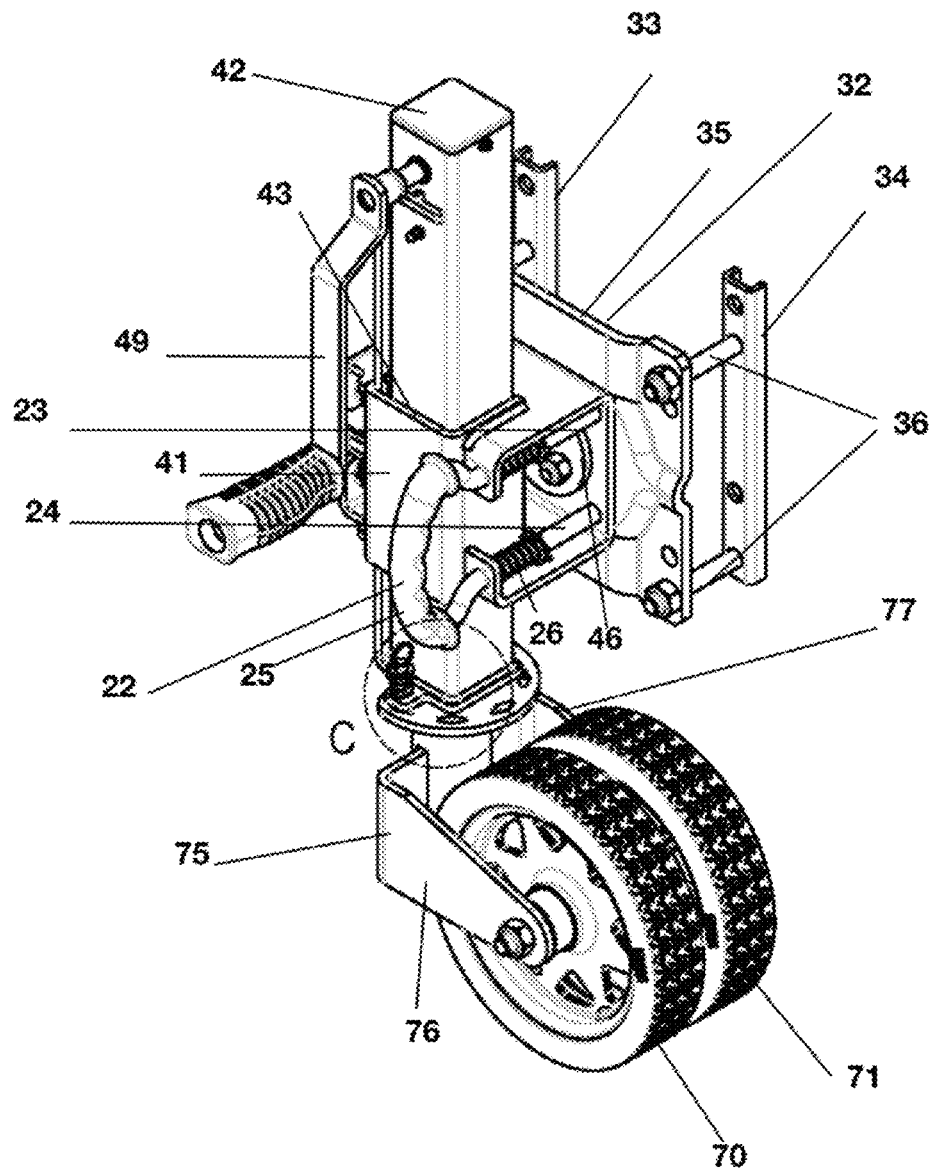
FIG. 2 is an isometric view of the jockey wheel of FIG. 1 from behind, above and to one side.
Figure 3:
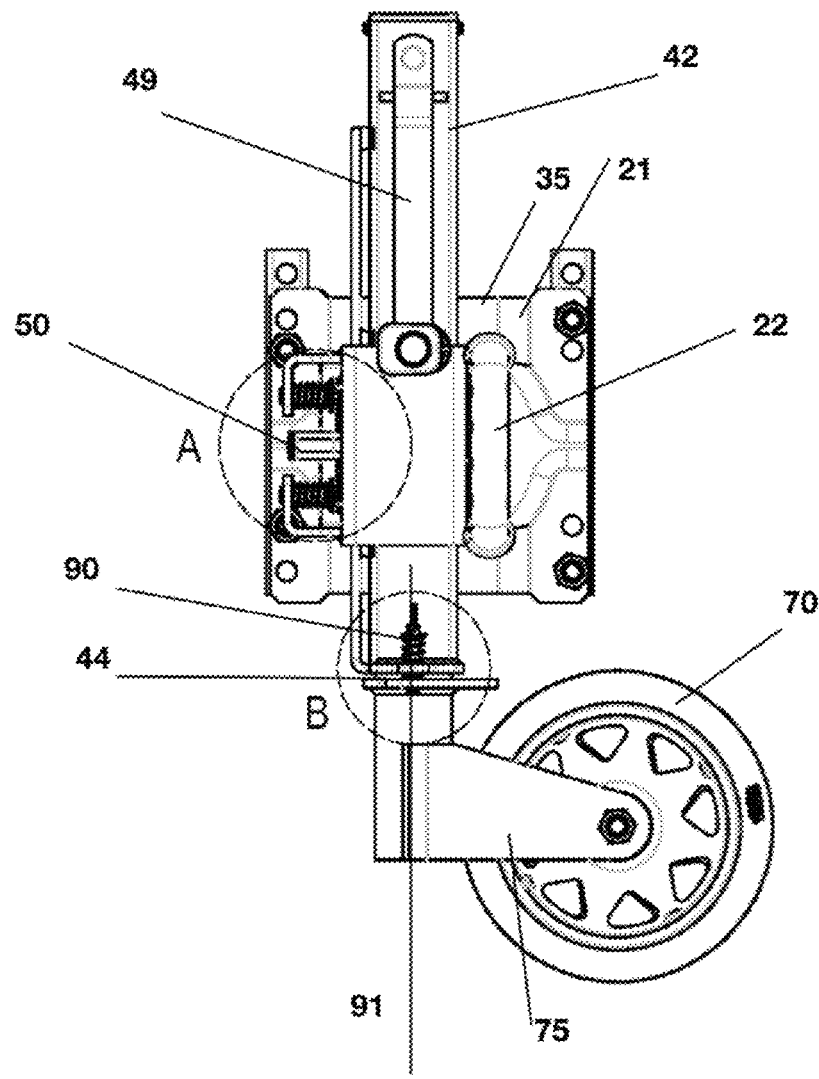
FIG. 3 is a side elevation view of the jockey wheel of FIG. 1.
Figure 4:
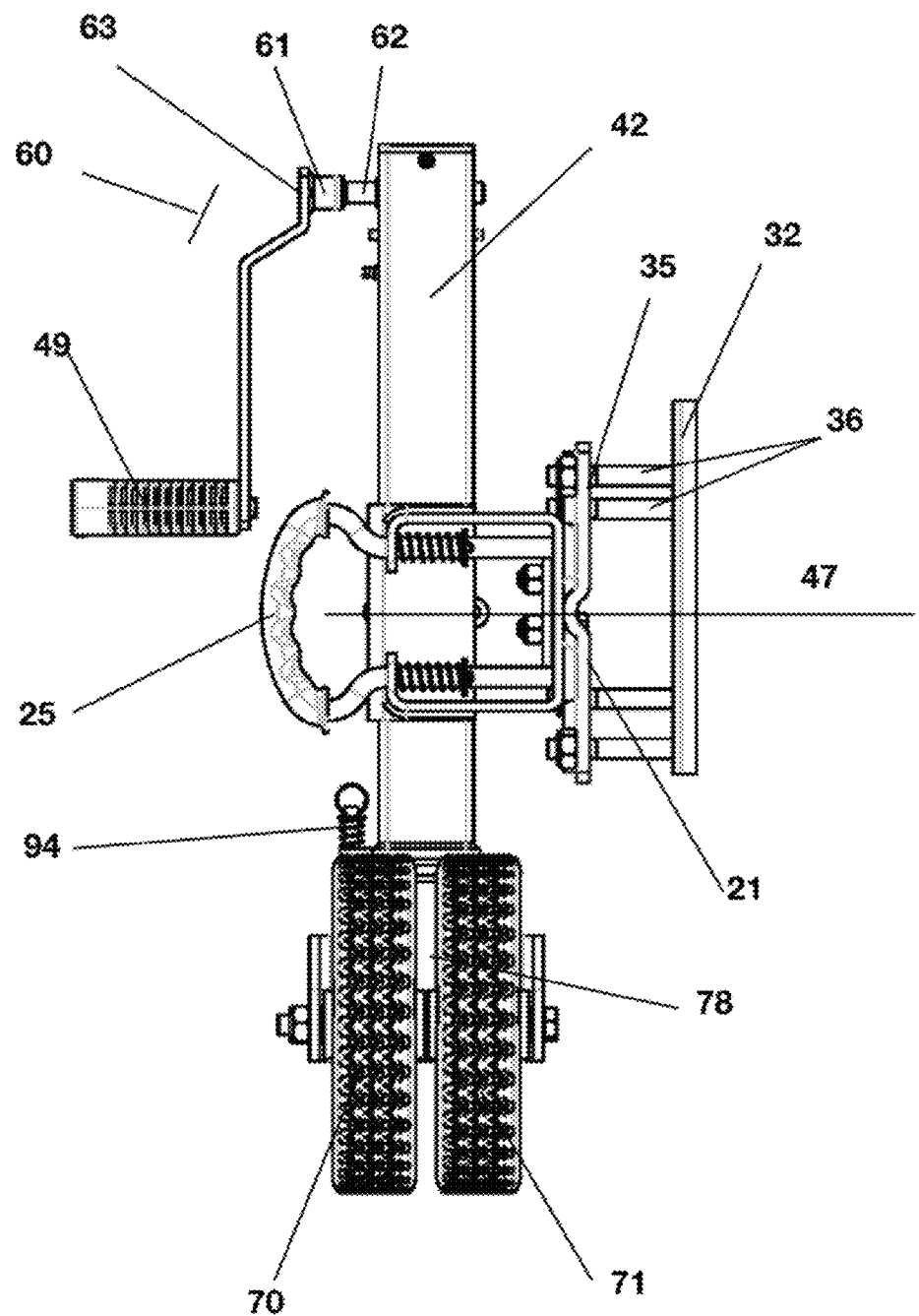
FIG. 4 is a rear elevation view of the jockey wheel of FIG. 1.
Figure 5:
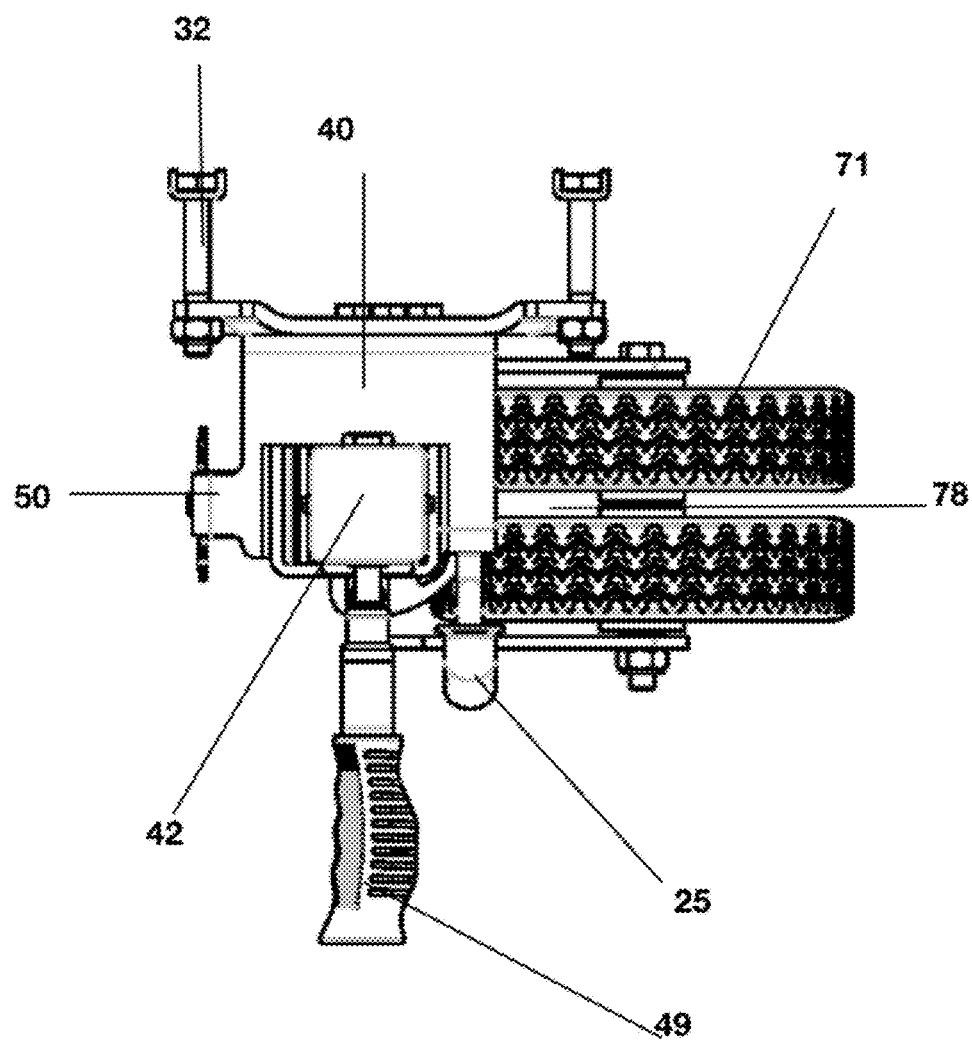
FIG. 5 is a plan view of the jockey wheel of FIG. 1.
Figure 6:
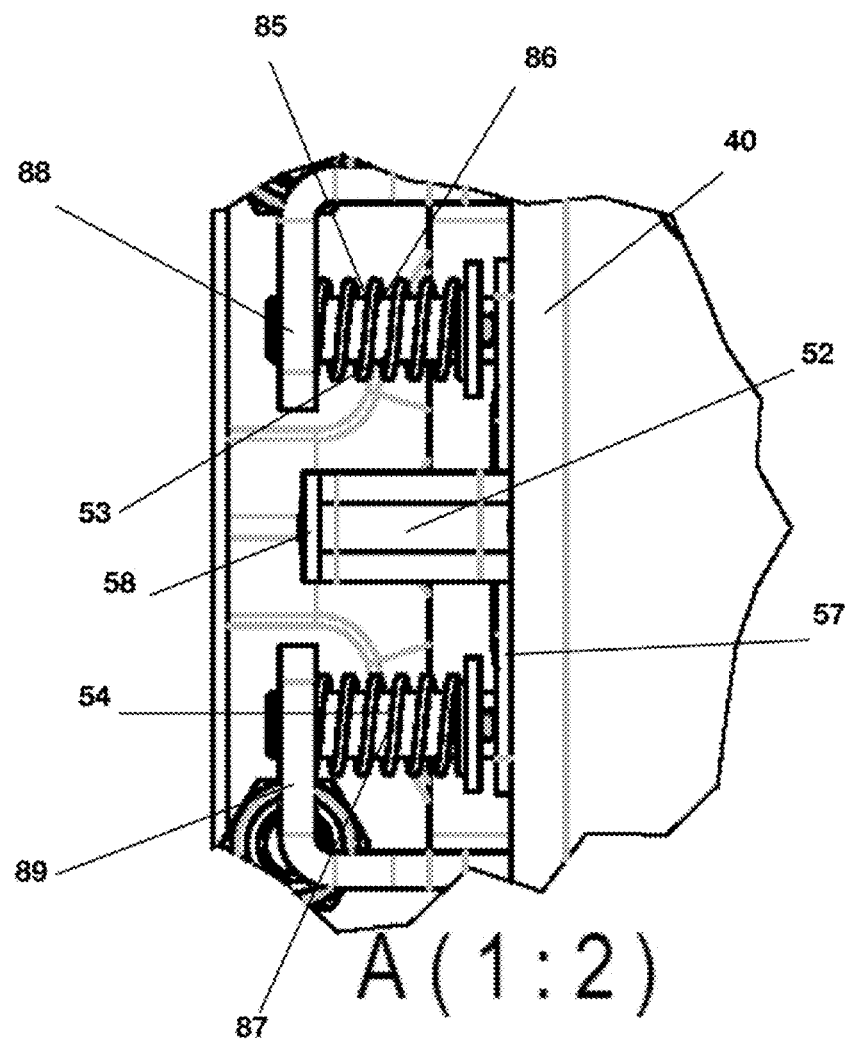
FIG. 6 is a side elevation detail view of the coarse adjuster circled A in FIG. 3.
Figure 7:
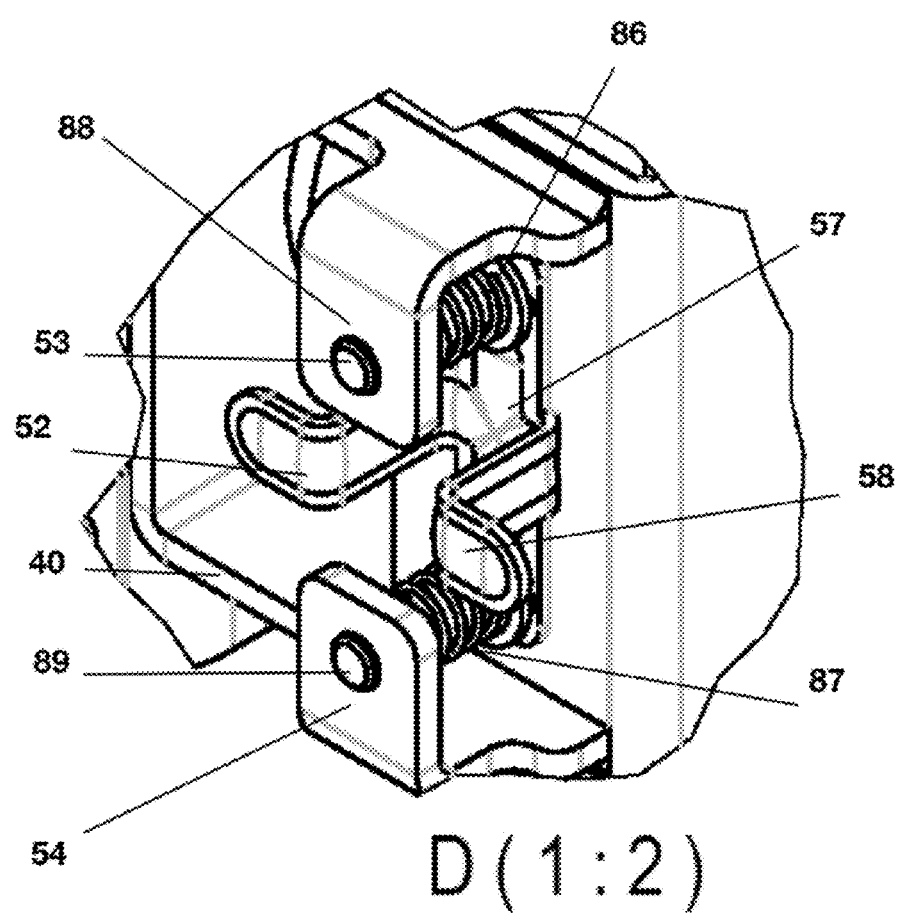
FIG. 7 is an isometric view of the coarse adjuster circled D in FIG. 1.
Figure 8:
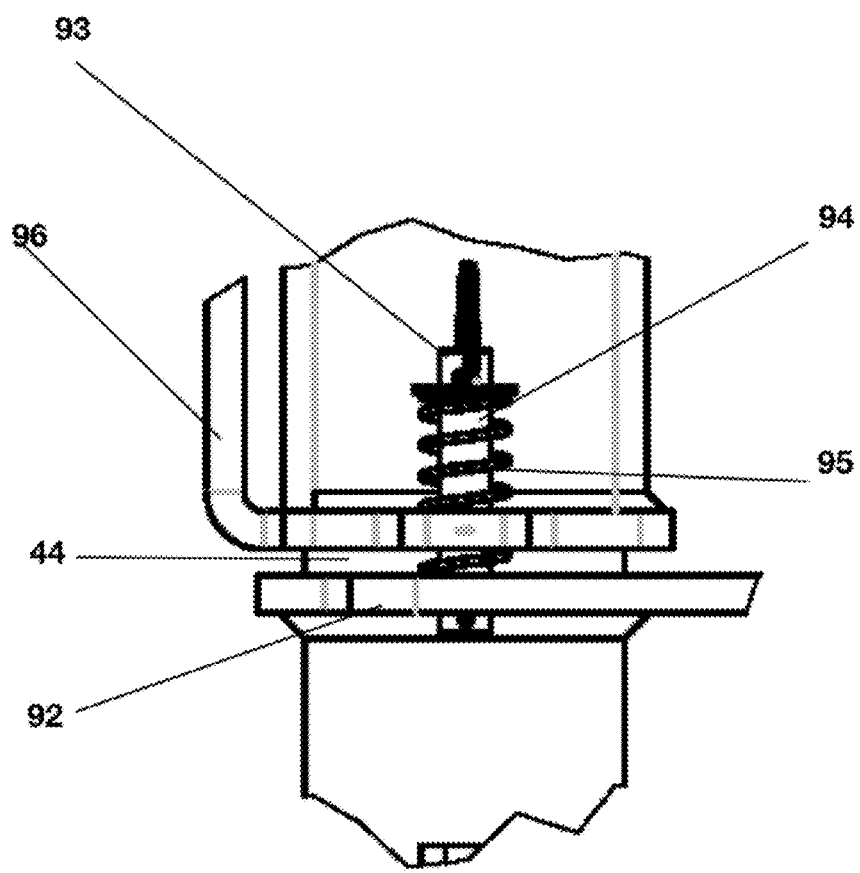
FIG. 8 is a side elevation view of the yaw lock circled in portion B in FIG. 3.
Figure 9:
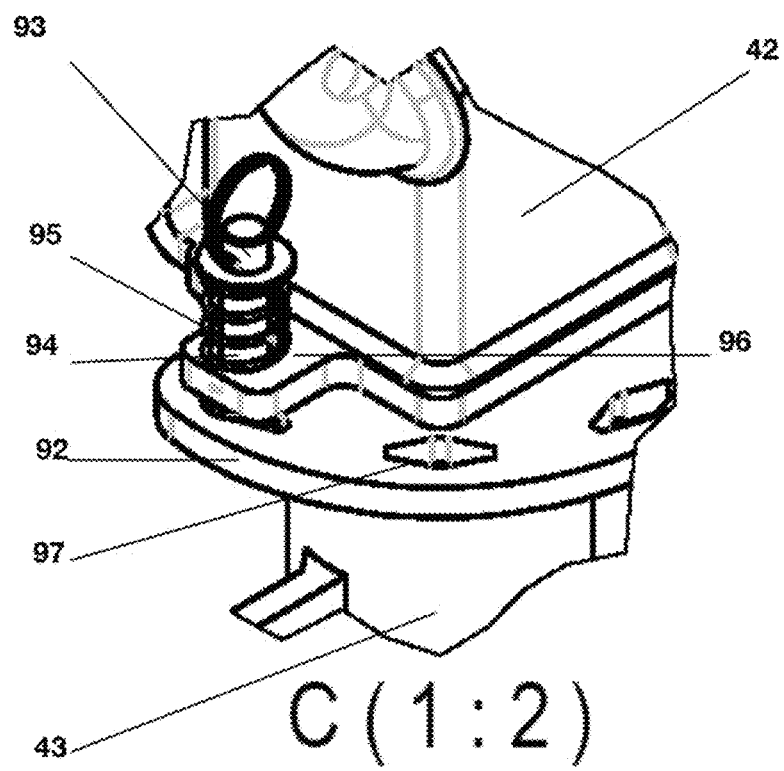
FIG. 9 is an isometric view of the yaw lock circled in portion C of FIG. 2.

Referring to FIGS. 1 to 9 there is shown a jockey wheel in accordance with an example embodiment generally indicated at 10. A trailer frame mount 30 is provided for mounting the jockey wheel 10 to a trailer frame (not shown), the jockey wheel 10 including a jockey wheel post carrier 40 for carrying a jockey wheel post sleeve 42. The jockey wheel 10 further includes a coarse height adjuster 50 for adjusting the height of the jockey wheel post sleeve 42, the coarse height adjuster 50 including a locking selector 52 for selecting a jockey wheel post height, the arrangement being such that the locking selector is biased into a locking position.

The trailer frame mount 30 includes a clamp 32. The clamp 32 includes a first backing member 33, a second backing member 34 and a jockey wheel post carrier mounting member 35. The clamp 32 includes first, second, third and fourth bolts 36 for clamping and bolting the first and second backing members 33 and 34 to the jockey wheel post carrier member 35 to the trailer frame member (not shown).

The jockey wheel post carrier mounting member 35 includes a bearing 46 so that the jockey wheel post carrier 40 may pivot about a pitch axis 47 between a deployed position (shown in the Figures) in which the jockey wheel post sleeve 42 is substantially vertical and a stowed position (not shown) in which the jockey wheel post sleeve 42 is substantially horizontal.

The jockey wheel post carrier 40 includes a main carrier body 41 and a void 43 through the main carrier body 41, the void 43 for receiving and carrying the jockey wheel post sleeve 42. The jockey wheel post carrier 40 includes the coarse height adjuster locking selector mounted thereon. The coarse height adjuster locking selector 52 includes a first pin 53 and a second pin 54, each pin being for interengagement with any one of a plurality of cooperating apertures 55 disposed on a coarse adjustment plate 56. The cooperating apertures 55 are through apertures which extend from one face of the plate 56 through to the other side to facilitate improved retention of the jockey wheel post sleeve 42 at a selected height. The coarse adjustment plate 56 is disposed on the jockey wheel post sleeve 42 and fastened thereto by welding.

The coarse adjustment plate 56 is disposed flat against the wall of the jockey wheel post sleeve 42 so that the through apertures are closed by the wall of the jockey wheel post sleeve 42. The wall of the jockey wheel post sleeve 42 is solid and does not allow the pins 53, 54 through so as to inhibit dust from passing into the inside of the sleeve, in which a fine adjustment mechanism is housed, so as to inhibit dust and other detritus from fouling the fine adjustment mechanism.

The locking selector 52 includes a pin carrier 57 for carrying the locking pins 53 and 54. The pin carrier 57 is operatively connected to actuation handles 58 for withdrawing the pins 53, 54 from a locking position into a free position in which the pins are disengaged from the cooperating apertures on the coarse adjustment plate.

The pins 53, 54 are biased into the locking position, and in that position they are interengaged with the cooperating apertures 55 disposed along the coarse adjustment plate 56. It is the ends of the pin carrier 57 which are biased into the locking position by a biasing means 85. The biasing means 85 is in the form of a first axial spring 86 and a second axial spring 87, which have one end disposed on a spring mounting bracket 88 and 89, mounted on the jockey wheel post carrier 40, and a second end disposed on the pin carrier 57.

The jockey wheel post sleeve 42 is orthogonal in section, and is in the form of a square hollow section sleeve element to facilitate simple and strong interfaces with associated parts. The jockey wheel post sleeve 42 includes an extensible post portion 44 disposed within the square hollow section post sleeve 42 to reduce storage volume required in a retracted position and to facilitate protection of the extensible post in the retracted position. The extensible post portion 44 is operatively connected to the jockey wheel post sleeve 42 by a fine tune assembly 60. The fine tune assembly 60 is, in the embodiment shown in the Figures, a threaded post cooperating with a threaded collar (not shown).

The fine tune assembly 60 is operatively connected to an actuation handle 49. The actuation handle 49 is detachable. The detachable actuation handle 49 includes a socket 61 for cooperating with a male head 62. The socket 61 includes a magnet (not shown) at an inner end 63 of the socket 61 for temporary grip on the male head 62.

A first ground engaging wheel 70 and a second ground engaging wheel 71 are disposed on the extensible jockey wheel post portion 44. Two wheels are provided to spread the load on the jockey wheel over a larger tyre contact patch area. The ground engaging wheels 70, 71 are disposed on the extensible post portion 44, and at the base thereof. The ground engaging wheels are mounted in a wheel carrier 75. The wheel carrier 75 includes two spaced-apart arms 76, 77 to rotatably support the two wheels 70, 71 disposed at the ends of the arms 76, 77. The arms 76, 77 of the wheel carrier form a wheel bight 78, such that the spaced-apart arms 76, 77 are disposed outside the two wheels 70,71 to facilitate protection of the wheels 70, 71.

A wheel yaw lock 90 is provided for inhibiting wheel 70, 71 movement about a yaw axis 91. The yaw lock 90 includes a yaw lock receiving flange 92 disposed at the base of the extensible post 44. The yaw lock receiving flange 92 is adapted to interlock with a cooperating yaw catch 93 disposed on the jockey wheel post sleeve 42. The cooperating yaw catch 93 includes a yaw locking pin 94. The yaw locking pin 94 also includes a biasing means 95 adapted to bias the yaw locking pin 94 to a yaw unlocking position. The cooperating yaw catch 93 includes a yaw locking pin mounting flange 96 disposed on the base of the jockey wheel post sleeve 42 for mounting the yaw locking pin 94. The yaw locking pin 94 in the yaw locking position is such that it extends from the yaw locking pin mounting flange 96 into the yaw lock receiving flange 92. The yaw lock receiving flange 92 includes a plurality of apertures 97 for receiving the yaw locking pin 94 to provide a plurality of selected yaw positions in which to lock the yaw locking pin 94. The apertures are through apertures and extend from a top face of the yaw lock receiving flange 92 to a bottom face to facilitate holding the yaw lock receiving flange in the locked position. The through apertures are elongate and tapered at each end of the elongate aperture so as to facilitate retention and inhibit clatter. In the locking position the yaw locking pin 94 is configured to be held in that position by a lug which mates with a recess on the underside of the yaw lock receiving flange 92, and the pin 94 is turned 90 degrees so as to access that recess.

The jockey wheel post carrier mounting member 35 is in the form of a plate 21. The jockey wheel carrier 40 includes a deployment actuator 22 which includes a first pin 23 and a second pin 24 connected by an actuation handle 25. The deployment actuator 22 is biased to a locked position (shown in the Figures) by springs 26. The pins 23 and 24 can be selectively retracted and extended to interengage with selected cooperating apertures on the plate 21 for stowed and deployed positions.

In order to deploy the jockey wheel, and select a height of the wheel, first, the jockey wheel is set into the deployed position, in which the jockey wheel post sleeve 42 is substantially vertical as shown in the Figures. Deployment is achieved by engaging pins 23 and 24 on the deployment actuator 22 in the deployment holes on the plate 21.

Next, the handles on the locking selector's pin carrier 57 are drawn back against the biasing force of the springs 86, 87. The pins 53, 54 are thus withdrawn from their cooperating apertures 55 on the coarse adjustment plate 56. A coarse height is selected and then the handles on the pin carrier 57 are released so that the pins find a location in the apertures 55 on the coarse adjustment plate 56.

The handle 49 on the fine tune assembly 60 is then attached to the male head 62 if necessary and then rotated so that the extensible post 44 extends for the wheels 70, 71 to engage the ground. The yaw locking pin 94 is withdrawn from the yaw lock receiving flange 92 so that the wheels can rotate freely about the yaw axis 91.

To move the jockey wheel to the stowed position the above-described deployment process is reversed.

Figure 10:
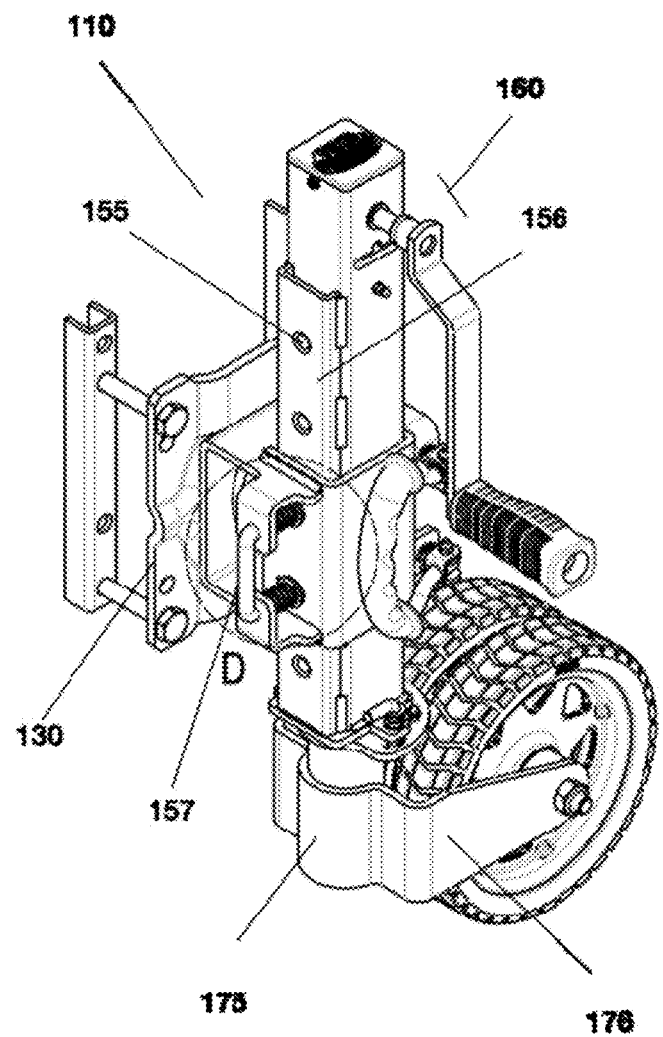
FIG. 10 is an isometric view of a jockey wheel in accordance with another embodiment of the present invention, the view from a position in front, above and to one side of the jockey wheel.
Figure 11:
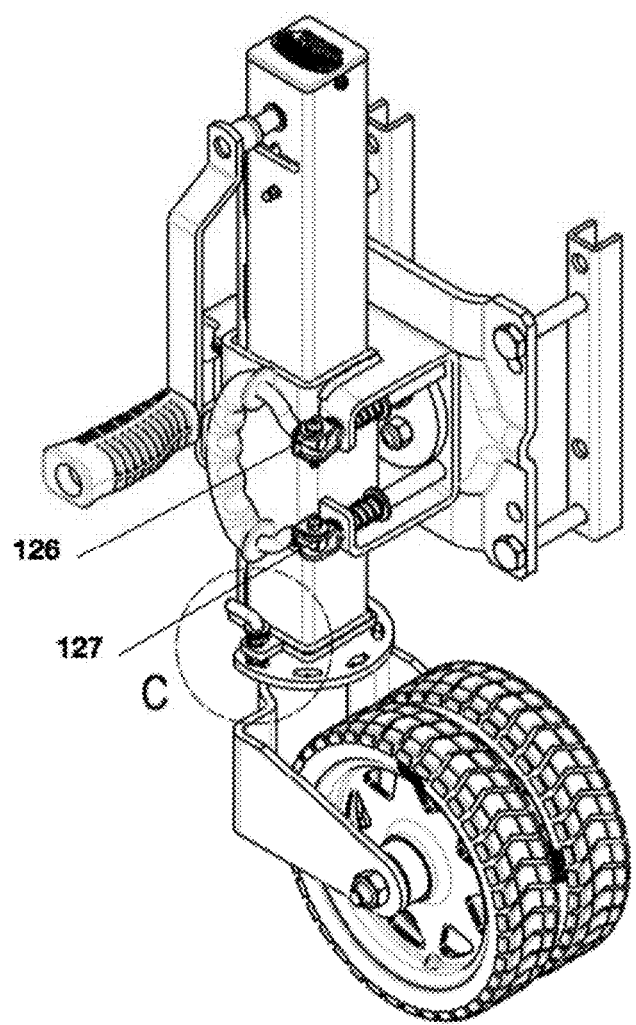
FIG. 11 is an isometric view of the jockey wheel of FIG. 10, the view from a position to the rear, above and to one side of the jockey wheel.
Figure 12:
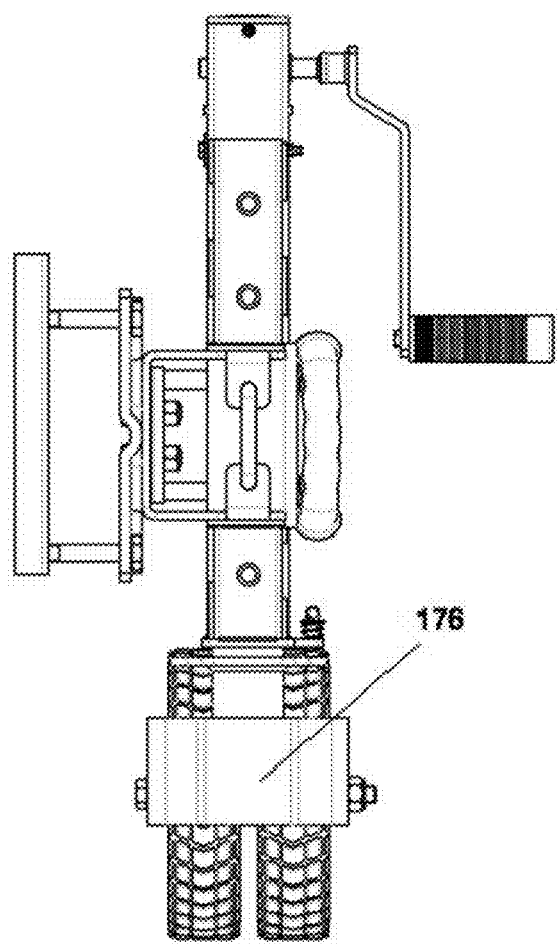
FIG. 12 is a front elevation view of the jockey wheel of FIG. 10.
Figure 13:
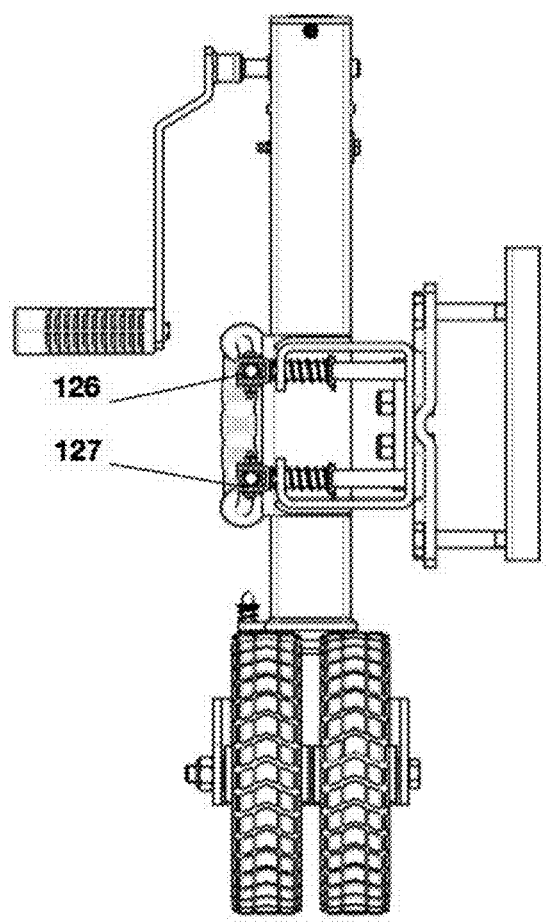
FIG. 13 is a rear elevation view of the jockey wheel of FIG. 10.
Figure 14:
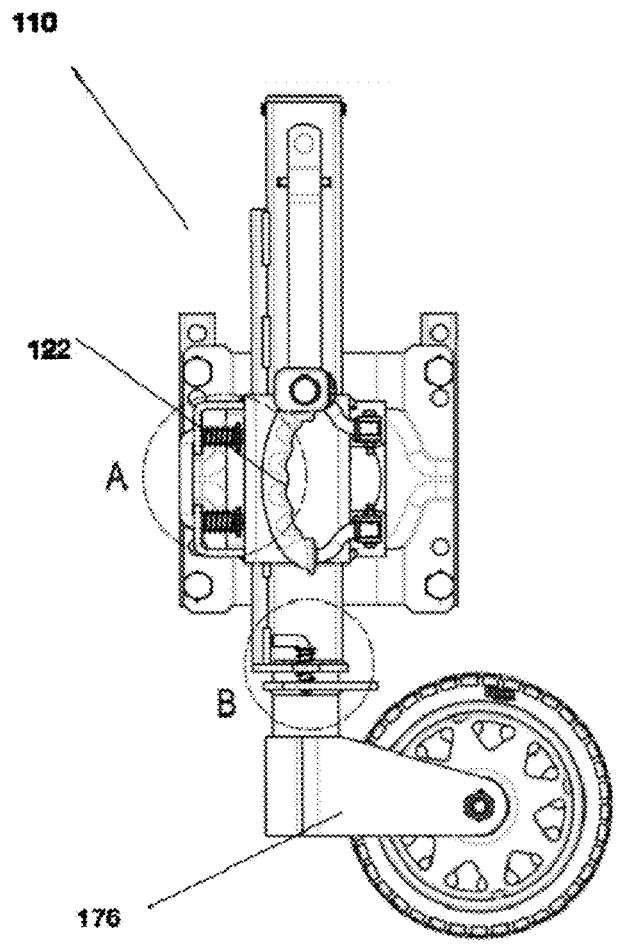
FIG. 14 is a side elevation view of the jockey wheel of FIG. 10.
Figure 15:
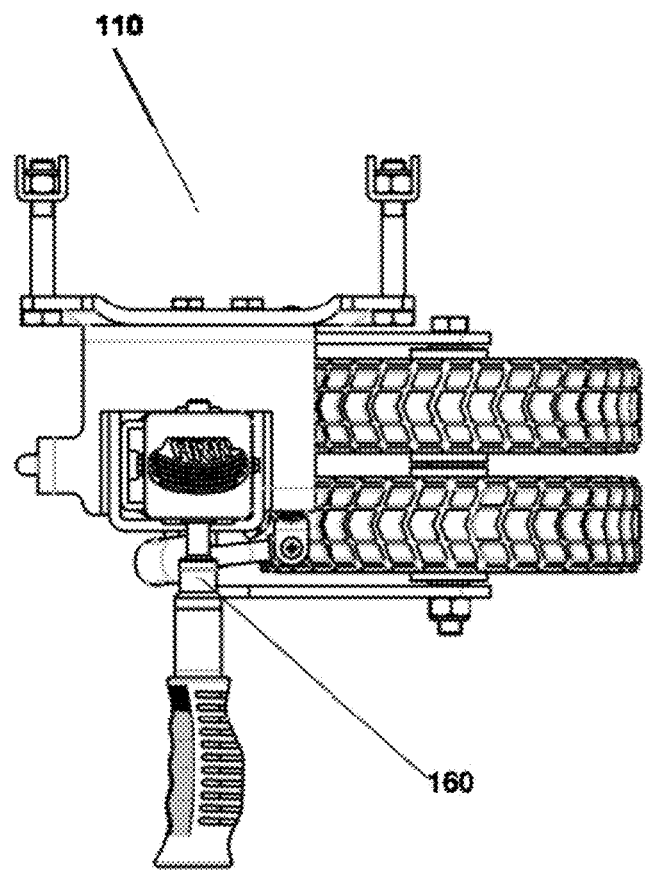
FIG. 15 is a plan view of the jockey wheel of FIG. 10.
Figure 16:
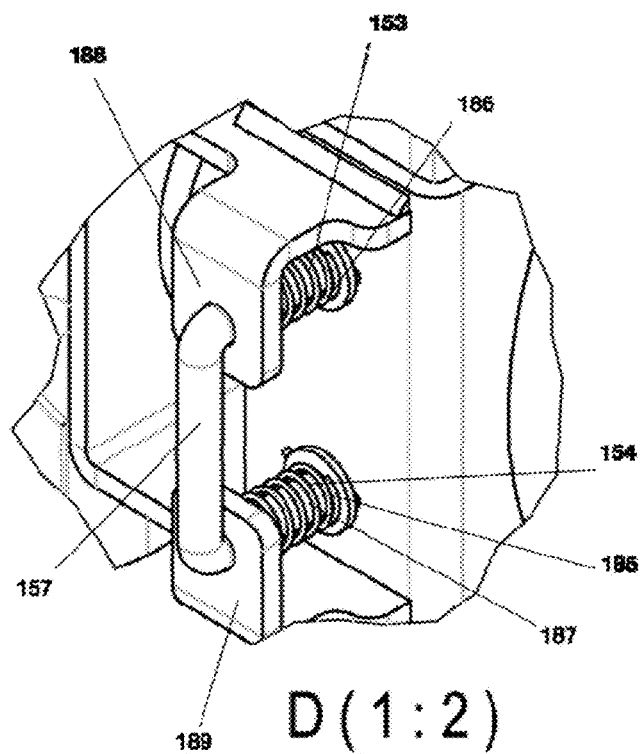
FIG. 16 is a detail view of a coarse adjuster circled D in FIG. 10.
Figure 17:
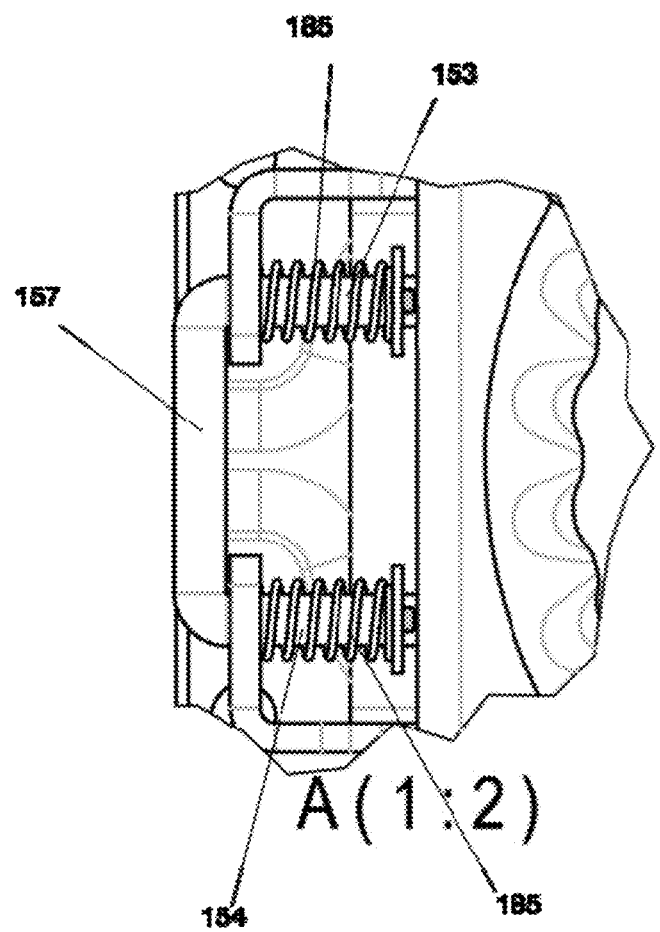
FIG. 17 is a detail view of the coarse adjuster circled A in FIG. 14.
Figure 18:
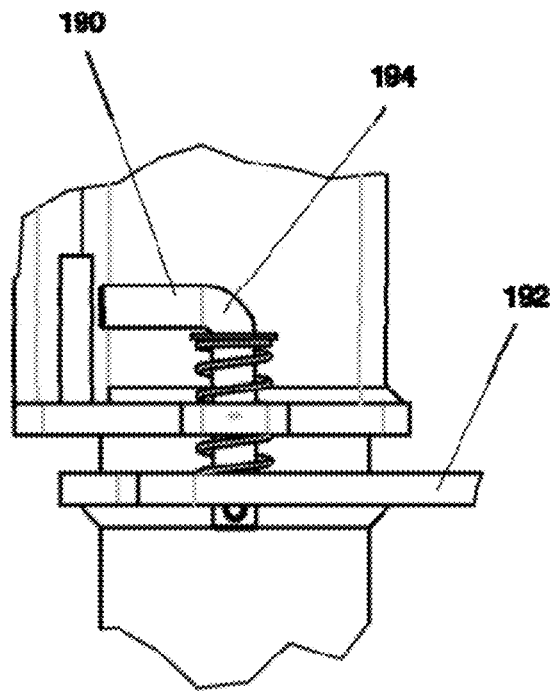
FIG. 18 is a detail view of a yaw lock circled B in FIG. 14.
Figure 19:
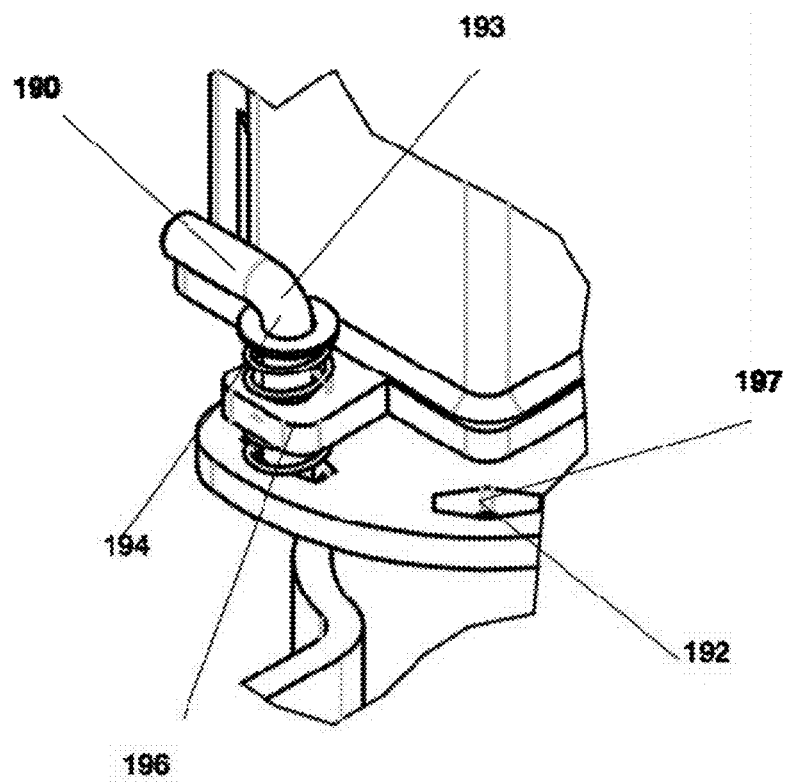
FIG. 19 is a detail isometric view of the yaw lock circled C in FIG. 11.

Referring to FIGS. 10 to 19 there is shown another example embodiment of the present invention, being an off road jockey wheel generally indicated at 110. Generally speaking, in FIGS. 10 to 19, as compared with FIGS. 1 to 9 and in the descriptions, like numerals will depict like components. The off road jockey wheel in FIGS. 10 to 19 is similar in many respects to that shown in FIGS. 1 to 9, but it differs in arrangements of the coarse height adjuster locking selector 152, the wheel yaw lock 190, the wheel carrier 175, and the deployment actuator 122, the arrangements of which are described hereinbelow.

The coarse height adjuster locking selector 152 includes a first pin 153 and a second pin 154, each pin being for interengagement with any one of a plurality of cooperating apertures 155 disposed on a coarse adjustment plate 156. The cooperating apertures 155 are through apertures which extend from one face of the plate 156 through to the other side to facilitate improved retention of the jockey wheel post sleeve 142 at a selected height. The coarse adjustment plate 156 is disposed on the jockey wheel post sleeve 142 and fastened thereto by welding.

The locking selector 152 of this embodiment is simpler than the first embodiment in that it includes an actuator handle 157 connecting the locking pins 153 and 154 and integral therewith. The actuator handle 157 can move the locking pins from a locking position into a free position in which the pins are disengaged from the cooperating apertures on the coarse adjustment plate.

The pins 153, 154 are normally biased into the locking position as shown in the drawings, and in that position they are interengaged with the cooperating apertures 155 disposed along the coarse adjustment plate 156. It is the ends of the pins which include a lug extending therefrom at their base which is pushed by a washer into the locking position by a biasing means 185. The biasing means 185 is in the form of a first axial spring 186 and a second axial spring 187, which have one end disposed on a spring mounting bracket 188 and 189, mounted on the jockey wheel post carrier 140, and a second end disposed on the pin washer which pushes on the pin lugs.

The deployment actuator 122 includes an actuation handle 125 which can draw the pins 123 and 124 from the apertures in the plate 121. The actuation handle includes two hinges 126 and 127 so that the handle itself can be stowed when not in use to reduce hazards to tripping and bruising for operators.

The wheel carrier 175 includes a strap 176 rather than welded arms directly to the wheel post so as to improve strength of the wheel carrier 175 in off road applications.

The yaw locking pin 194 is in the form of a bent pin so as to facilitate a rotation of a quarter turn or 90° so that the wheel can be locked and inhibited from clattering.

In this specification, where a document, act or item of knowledge is referred to or discussed, this reference or discussion is not an admission that the document, act or item of knowledge or any combination thereof was at the priority date:

(a) part of common general knowledge; or (b) known to be relevant to an attempt to solve any problem with which this specification is concerned.

It is to be noted that, throughout the description and claims of this specification, the word 'comprise' and variations of the word, such as 'comprising' and 'comprises', is not intended to exclude other variants or additional components, integers or steps. Modifications and improvements to the invention will be readily apparent to those skilled in the art. Such modifications and improvements are intended to be within the scope of this invention.

The invention claimed is:

1. A jockey wheel including:
   at least one ground engaging wheel;
   a mount for mounting the jockey wheel to a frame element of a trailed vehicle;
   a jockey wheel post assembly including a jockey wheel post sleeve and an extensible jockey wheel post portion configured to extend from the jockey wheel post sleeve;
   a jockey wheel post assembly carrier for carrying the jockey wheel post assembly, the jockey wheel post assembly carrier operatively connected to the mount;
   a fine tuner operatively connecting the extensible jockey wheel post portion to the jockey wheel post sleeve so as to extend the extensible jockey wheel post portion; and
   a coarse height adjuster connected to the jockey wheel post assembly carrier for adjusting the height of the jockey wheel post assembly, the coarse height adjuster including a locking selector for selecting a jockey wheel post assembly height, the locking selector being biased into a locking position; the coarse height adjuster further comprises a coarse adjustment plate having a plurality of holes disposed there along, the coarse adjustment plate disposed flat against the jockey wheel post sleeve, whereby the disposition of the coarse adjustment plate such that a wall of the jockey wheel post sleeve closes the apertures at the end of the coarse adjustment plate;
   wherein the coarse height adjuster locking selector further includes at least one locking pin for interengaging with the plurality of apertures disposed on the jockey wheel post assembly.

2. The jockey wheel in accordance with claim 1 wherein the mount is a trailer frame mount and includes a clamp for clamping the jockey wheel post carrier to the trailer frame.

3. The jockey wheel in accordance with claim 1 wherein the jockey wheel post carrier includes a bearing so that the jockey wheel post carrier is configured to swivel or pivot about a pitch axis between a deployed position in which the jockey wheel post is substantially vertical and a stowed position in which the jockey wheel post is substantially horizontal.

4. The jockey wheel in accordance with claim 1 wherein the jockey wheel post assembly carrier includes a main carrier body which includes the coarse height adjuster locking selector mounted thereon.

5. The jockey wheel in accordance with claim 1 wherein the coarse height adjuster locking selector also includes an actuation handle connecting two locking pins for interengaging with cooperating apertures, and the locking pins are biased into the locking position in which they are interengaged with the cooperating apertures.

6. The jockey wheel in accordance with claim 1 wherein the jockey wheel post sleeve is hollow and square in section.

7. The jockey wheel in accordance with claim 1 wherein the fine tuner is operatively connected to a detachable actuation handle, the actuation handle comprising a socket for cooperating with a male head.

8. The jockey wheel in accordance with claim 7 wherein the socket includes a magnet at an inner end of the socket for temporary grip on the male head.

9. The jockey wheel in accordance with claim 1 further comprises a wheel carrier disposed on the extensible jockey wheel post portion, the wheel carrier comprising two spaced-apart arms configured to operatively carry at least two wheels disposed at their ends to spread the normal force load from the jockey wheel over a larger tyre contact area.

10. The jockey wheel in accordance with claim 9 wherein the wheel carrier is a strap which extends from one side of the wheels to the other, having an intermediate portion which is connected to a base portion of the extensible jockey wheel post portion.

11. A jockey wheel in accordance with claim 1 further comprising:
a yaw lock for inhibiting movement of the ground engaging wheel about a yaw axis, the yaw lock comprising a yaw lock flange mounted on the jockey wheel post assembly at a base thereof so that the yaw lock flange rotates with the ground engaging wheel.

12. The jockey wheel in accordance with claim 11 wherein the yaw lock flange includes a receiver which is adapted to interlock with a cooperating yaw catch disposed on the jockey wheel post assembly, and wherein the cooperating yaw catch includes a yaw locking pin.

13. The jockey wheel in accordance with claim 12 wherein the yaw locking pin can move from an unlocked position to a locked position and the yaw lock further includes a biasing means adapted to bias the yaw locking pin into the unlocked position.

14. The jockey wheel in accordance with claim 12 wherein the jockey wheel post assembly includes a jockey wheel post sleeve and an extensible post portion which is configured to extend from the jockey wheel post sleeve, and the cooperating yaw catch includes a yaw locking pin mounting flange disposed on the base of the extensible post portion and the yaw locking pin, in the yaw locking position, is such that it is configured to extend from the yaw locking pin mounting flange into the receiver of the yaw lock flange, wherein the yaw lock flange includes a plurality of apertures spaced around the yaw lock flange for receiving the yaw lock pin at selected yaw angles.

15. The jockey wheel in accordance with claim 1 further including a yaw lock for inhibiting movement of the ground engaging wheel about a yaw axis, the yaw lock comprising a yaw lock flange mounted on the jockey wheel post assembly at a base thereof so that the yaw lock flange rotates with the ground engaging wheel.

16. The jockey wheel in accordance with claim 15 wherein the yaw lock flange includes a receiver which is adapted to interlock with a cooperating yaw catch disposed on the jockey wheel post assembly and wherein the cooperating yaw catch includes a yaw locking pin.

* * * * *